United States Patent
Kishi

(10) Patent No.: US 8,740,292 B2
(45) Date of Patent: Jun. 3, 2014

(54) VEHICLE BODY SUPERSTRUCTURE

(75) Inventor: Shinichi Kishi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 213 days.

(21) Appl. No.: 13/290,129

(22) Filed: Nov. 7, 2011

(65) Prior Publication Data
US 2012/0126582 A1   May 24, 2012

(30) Foreign Application Priority Data
Nov. 19, 2010   (JP) ................ 2010-259024

(51) Int. Cl.
B62D 25/04   (2006.01)

(52) U.S. Cl.
USPC .......... 296/203.01; 296/210; 296/30

(58) Field of Classification Search
USPC ........... 296/203.01, 193.06, 216.09, 203.03, 296/187.01, 29, 30, 210, 209, 185.1
See application file for complete search history.

(56) References Cited

U.S. PATENT DOCUMENTS

| | | | | |
|---|---|---|---|---|
| 5,226,696 A | * | 7/1993 | Klages et al. | 296/203.01 |
| 5,873,618 A | * | 2/1999 | Ejima | 296/30 |
| 6,616,217 B1 | * | 9/2003 | Robinson | 296/178 |
| 6,698,823 B2 | * | 3/2004 | Kim | 296/203.03 |
| 7,165,806 B2 | * | 1/2007 | Osterberg et al. | 296/203.03 |
| 7,293,823 B2 | * | 11/2007 | Chen et al. | 296/203.03 |
| 7,431,378 B2 | * | 10/2008 | Chen et al. | 296/102 |
| 7,963,591 B2 | * | 6/2011 | Duguet et al. | 296/203.03 |
| 8,042,863 B2 | * | 10/2011 | Nydam | 296/210 |
| 8,210,602 B2 | * | 7/2012 | Kobayashi et al. | 296/203.03 |
| 2001/0033096 A1 | * | 10/2001 | Hanyu | 296/203.01 |
| 2009/0115224 A1 | * | 5/2009 | Weirup | 296/203.01 |

FOREIGN PATENT DOCUMENTS

| | | |
|---|---|---|
| JP | 10-100936 | 4/1998 |
| JP | 10-167114 | 6/1998 |
| JP | 2006-193037 | 7/2006 |
| JP | 2007-030716 | 2/2007 |
| JP | 2007-083830 | 4/2007 |
| JP | 2009-120140 | 6/2009 |
| JP | 2009-298335 | 12/2009 |

OTHER PUBLICATIONS

Japanese Office Action for corresponding JP Application No. 2010-259024, Oct. 10, 2012.

* cited by examiner

*Primary Examiner* — Glenn Dayoan
*Assistant Examiner* — Pinel Romain
(74) *Attorney, Agent, or Firm* — Ditthavong Mori & Steiner, P.C.

(57) ABSTRACT

A vehicle body superstructure includes a first side rail member, a second side rail member, a roof member, and a gusset. The gusset includes a rail side surface, a roof side surface, a first claw, a second claw, and a bead. The rail side surface extends along a vertical direction of a vehicle body and is connected to the first and second side rail members. The roof side surface extends along a breadthways direction of the vehicle body and is connected to the roof member. The first claw is provided at a first longitudinal end of the gusset and locked in a first locking portion provided in the first side rail member. The second claw is provided at a second longitudinal end of the gusset and is locked in a second locking portion provided in the second side rail member.

8 Claims, 7 Drawing Sheets

*BACKGROUND ART*

BACKGROUND ART

VEHICLE BODY SUPERSTRUCTURE

CROSS-REFERENCE TO RELATED APPLICATIONS

The present application claims priority under 35 U.S.C. §119 to Japanese Patent Application No. 2010-259024, filed Nov. 19, 2010, entitled "Vehicle Body Superstructure". The contents of this application are incorporated herein by reference in their entirety.

BACKGROUND OF THE INVENTION

1. Field of the Invention

The present invention relates to a vehicle body superstructure.

2. Discussion of the Background

A body superstructure of a motor vehicle includes a roof member constituting a roof of a vehicle body, side rail members extending longitudinally at the right and left ends of the roof, and a gusset provided so as to straddle a joining portion between the roof member and the side rail members (for example, see Japanese Unexamined Patent Application Publication No. 2009-298335 (FIGS. 1 and 2)).

The gusset is configured to reinforce a joining portion between, for example, the roof member and the side rail members or a joining portion between vehicle body frame members and are attached to the members by, for example, spot welding or bolt fixation so as to straddle the joining portion between the members.

In a vehicle body superstructure disclosed in Japanese Unexamined Patent Application Publication No. 2009-298335, a gusset is provided so as to straddle a joining portion between side rail members (side inner members) and a roof member (roof rail). The gusset has a substantially horizontal roof rail fixing surface that is fixed to the bottom surface of the roof rail, a substantially vertical pillar fixing surface that is fixed to the side inner member, and a slanted reinforcement portion having a triangle shape, as viewed from the front, which is obliquely formed between the roof fixing surface and the pillar fixing surface. The gusset is formed by folding, for example, a metal sheet substantially in an L shape as viewed from the front.

The roof rail fixing surface has an anti-fall portion formed therein which is locked in a locking portion formed in the roof rail. The pillar fixing surface has an anti-misalignment portion formed therein which is locked in a locking portion formed in the side inner member.

The gusset has a slanted portion having a triangle shape, as viewed from the front, which is provided between the substantially horizontal roof rail fixing surface and the substantially vertical pillar fixing surface so as to extend toward a vehicle interior.

FIG. 7 is a view showing a body superstructure of a conventional motor vehicle and a perspective view depicting the state in which a roof arch gusset is installed. In addition, FIG. 8 is a view showing a body superstructure of a conventional motor vehicle, which is a perspective view of the roof arch gusset.

As shown in FIGS. 7 and 8, a gusset 200 (roof arch gusset) need not have slanted portion described above. In the case of a gusset with no slanted portion, a side curtain airbag (not illustrated) is mounted in the interior side of a roof rail 100 and the gusset 200. In addition, a roof lining (not illustrated) as an interior trim and a center pillar garnish 300 are installed so as to cover the interior side of the side curtain airbag. The center pillar garnish 300 is locked in a tongue 310 provided at an upper end of the roof lining.

As shown in FIG. 7, the gusset 200 is secured at front and rear ends of an upper end 210 thereof to a roof member 400 of a roof stiffener with bolts 500 and secured at front and rear ends of a lower end 220 thereof to a roof rail 100 thereof to a roof rail 100 with the bolts 500. The gusset 200 has bolt insertion holes for insertion of the bolts 500 formed at four ends and in the center totaling five locations therein. The gusset 200 also has a notch 240 for forming a claw 250 provided in a lower middle portion thereof.

SUMMARY OF THE INVENTION

According to one aspect of the present invention, a vehicle body superstructure comprises a first side rail member, a second side rail member, a roof member, and a gusset. The first side rail member extends along a longitudinal direction of a vehicle body. The second side rail member extends along the longitudinal direction. The roof member includes a first end and a second end. The first end is supported by the first side rail member. The second end is supported by the second side rail member. The gusset comprises a rail side surface, a roof side surface, a first claw, a second claw, and a bead. The rail side surface extends along a vertical direction of the vehicle body and is connected to the first and second side rail members. The roof side surface extends along a breadthways direction of the vehicle body and is connected to the roof member. The first claw is provided at a first longitudinal end of the gusset and locked in a first locking portion provided in the first side rail member. The second claw is provided at a second longitudinal end of the gusset and is locked in a second locking portion provided in the second side rail member. The bead is provided between the first and second claws to extend from a bottom end of the rail side surface to a breadthways inner end of the roof side surface.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
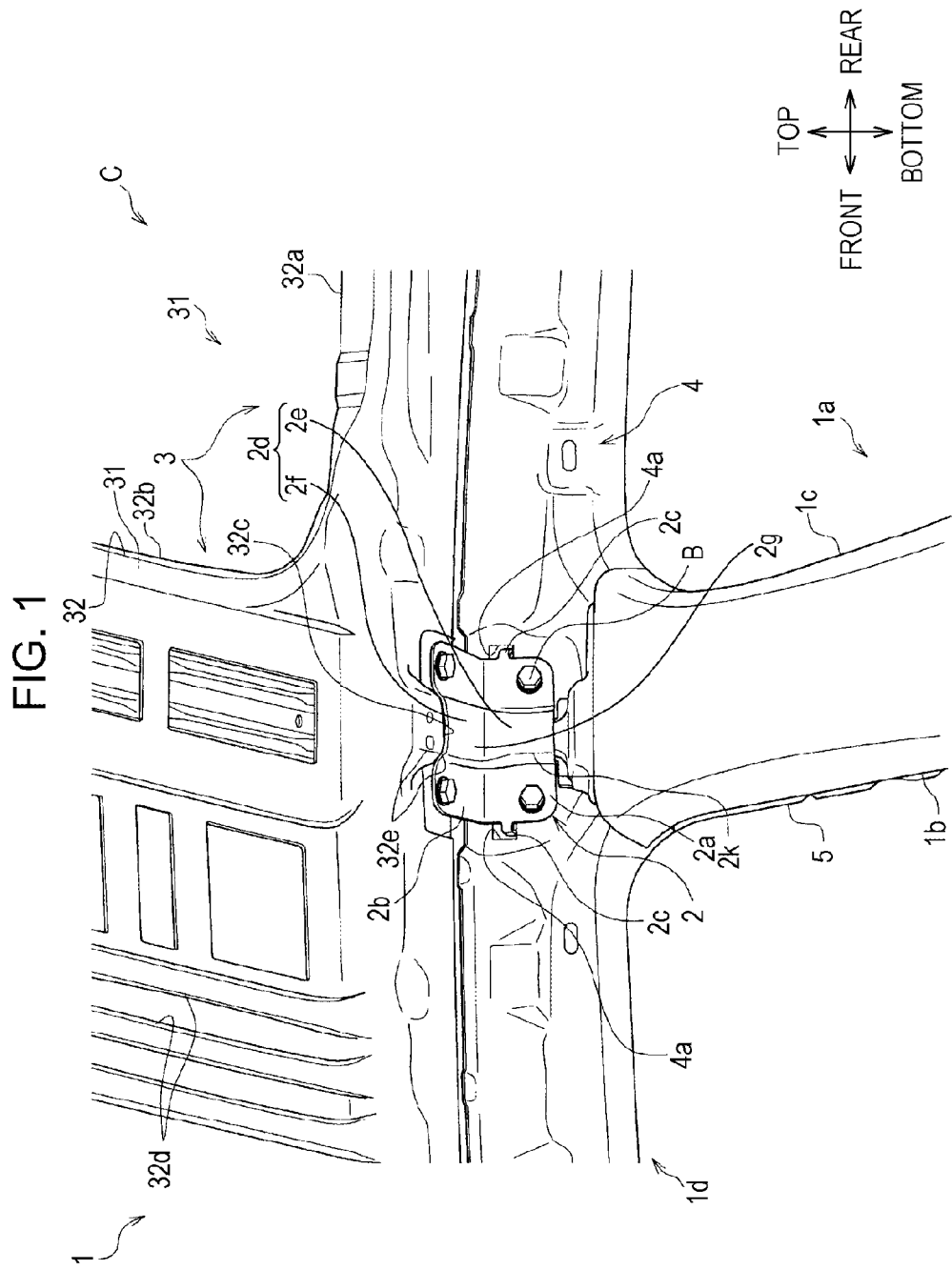
FIG. 1 is a schematic perspective view showing an example of a vehicle body superstructure according to an embodiment of the present invention.

The embodiments will now be described with reference to the accompanying drawings, wherein like reference numerals designate corresponding or identical elements throughout the various drawings.

A vehicle body superstructure according to an embodiment of the present invention is described below with reference to FIGS. 1 through 6.

In the embodiment of the present invention, reference to "front" indicates the forward movement side of the vehicle C, reference to "rear" indicates the rearward movement side of the vehicle C, reference to "upper" indicates a vertically upper side, and reference to "lower" indicates a vertically lower side.

[Vehicle Configuration]

A vehicle C, which employs a vehicle body superstructure, is described below before a vehicle body superstructure according to an embodiment of the present invention is described.

As shown in FIG. 1, a vehicle C is a motor vehicle that has a roof member 3 including a roof panel 31, a pair of side rail members 4 provided below the roof member 3 so as to extend longitudinally, and gussets 2 that join the side rail members 4 and the roof member 3 for reinforcement. The vehicle C has no limitation in terms of type or shape. In other words, the vehicle C may be a passenger car, a truck, or a service vehicle as long as a body 1 of the vehicle C is provided with the gussets 2 that reinforce connecting portions between the roof member 3 and the side rail members 4 and the like. For convenience, the embodiment will be described by way of an example of a passenger car.

[Vehicle Body Configuration]

As shown in FIG. 1, a vehicle body 1 is a framework member that forms the whole of the vehicle C, which includes a metallic body frame, such as the side rail members 4 to be described later, and a metallic body panel, such as a roof panel 31. The vehicle body 1 has door openings 1b, 1c formed at either body side 1a thereof, in which a door (not illustrated) is mounted so as to be openable and closable.

In the vehicle body 1, the right and left body sides 1a are bilaterally symmetric, and thus description of a passenger seat side (left side) is omitted.

[Body Upper Portion Configuration]

As shown in FIG. 1, the roof member 3 that is an upper section of the entire vehicle body 1 and constitutes a roof section of the vehicle body 1, the side rail members 4 that constitute a framework adjacent to right and left sides of the roof member 3, the gussets 2, and pillars 5 extending downward from the side rail members 4 are mainly disposed in a body upper portion 1d.

In the body upper portion 1d, each of the pillars 5 to be described later is constructed of, for example, a center pillar portion disposed in the middle of the side rail members 4, a front pillar portion (not illustrated) disposed at the front end of the side rail member 4, and a rear pillar portion (not illustrated) disposed at the rear end of the side rail member 4.

The roof member 3, the side rail members 4, and the gussets 2 are described below by way of an example of the pillars 5 that are the center pillar portion disposed in the rightward middle of the vehicle C in the body side 1a of the body upper portion 1d.

The door opening 1b is a opening in which a front side door is disposed so as to be openable and closable. The front pillar (not illustrated) is disposed at the front end of the door opening 1b, while the pillar 5 as the center pillar is disposed at the rear end of the door opening 1b.

The door opening 1c is a opening in which a rear side door is disposed so as to be openable and closable. The pillar 5 is disposed at the front end of the door opening 1c, while the rear pillar (not illustrated) is disposed at the rear end of the door opening 1c.

[Roof Member Configuration]

As shown in FIG. 1, the roof member 3 is a member that is supported at both ends thereof by the side rail members 4 and forms the roof of the vehicle C, which includes a roof panel 31, a roof stiffener 32, and a roof lining (not illustrated).

[Roof Panel Configuration]

The roof panel 31 is a plate member that constitutes the surface of the roof and is made of a metal plate, such as a rolled steel plate, formed substantially in a rectangular shape as viewed from the top. Both the right and left ends of the roof panel 31 are welded together with the side rail members 4 and the pillars 5 in a so-called mohican groove (not illustrated).

[Roof Stiffener Configuration]

As shown in FIG. 1, the roof stiffener 32 is disposed below the roof panel 31. The roof stiffener 32 is a member formed of a metallic plate member, such as a steel plate, which supports the roof panel 31 so as to be connected to the side rail members 4 and is provided in a plurality at appropriate intervals over the range between the front end and the rear end of the vehicle body and between a pair of right and left ends. The roof stiffener 32 is integrally formed of a side frame 32a connecting the right and left ends of the roof panel 31 and the side rail members 4, a roof rail 32b provided over a section between the right and left frames 32a, 32a, a projecting portion 32c formed at a position corresponding to the breadthways inner side of a bead 2d, and a reinforcing corrugated portion 32d for reinforcing the roof stiffener 32.

The side frame 32a extends longitudinally adjacent to each of the right and left side rail members 4 and supports the right and left ends of the roof panel 31.

The roof rail 32b is provided between the side frames 32a, 32a so as to extend breadthways. In the body upper portion 1d, the roof rail 32b is disposed so as to be laid between connection portions with which the upper portion of the pillar 5 is connected to the side rail members 4. There is no limitation to the number of the roof rail 32b.

The projecting portion 32c is a bulge that is formed so as to fit into a lateral bead 2f a vertical section of which is recess-shaped, and plays a role of reinforcing a region in which the gusset 2 is attached to the roof stiffener 32 and at the same time supports the gusset 2 in place through the engagement of the lateral bead 2f.

The reinforcing corrugated portion 32d is a press-formed member with projection-shaped and recess-shaped sections, which is configured to enhance the strength of the roof stiffener 32 made of a metallic plate member, and is provided in various locations within the roof stiffener 32. The reinforcing corrugated portion 32d extends longitudinally in the side frame 32a and extends breadthways in the roof rail 32b.

[Side Rail Member Configuration]

As shown in FIG. 1, each of the side rail members 4 is a member to which the right and left ends of the roof member 3 and the pillar 5 are connected and which extends longitudinally in the body upper portion 1d of the body side 1a with the gusset 2 straddling joining portions between the side rail members 4 and the roof member 3. The side rail members 4 are fabricated by joining a plurality of panel members, such as a roof side rail inner and a roof side rail outer, so as to form a tube-shaped member with a closed vertical section, and serves as a framework member of the vehicle body 1. The side rail members 4 each have a pair of locking portions 4a into which claws 2c formed at either side of the gusset 2 are inserted and bolt holes 4b (see FIG. 4) through which the two of four bolts B for securing the gusset 2 to the vehicle body 1 are inserted.

[Locking Portion Configuration]

The locking portions 4a each consist of a pair of rectangular holes whose vertical sides are longer than the horizontal sides, into which the pair of claws 2c are inserted, thereby supporting the gusset 2. The locking portions 4a also serve as a locater in locating bolt insertion holes 2j (see FIG. 3) at the bolt holes 4b (see FIG. 4) formed in the side rail members 4. The locking portions 4a are formed by performing drilling at predetermined positions in the side rail members 4, which correspond to the claws 2c formed close to the longitudinal center line of the gusset 2. The vertical length of the locking portions 4a is larger than that of the claws 2c. The longitudinal length of the locking portions 4a is larger than that of the claws 2c.

Figure 4:
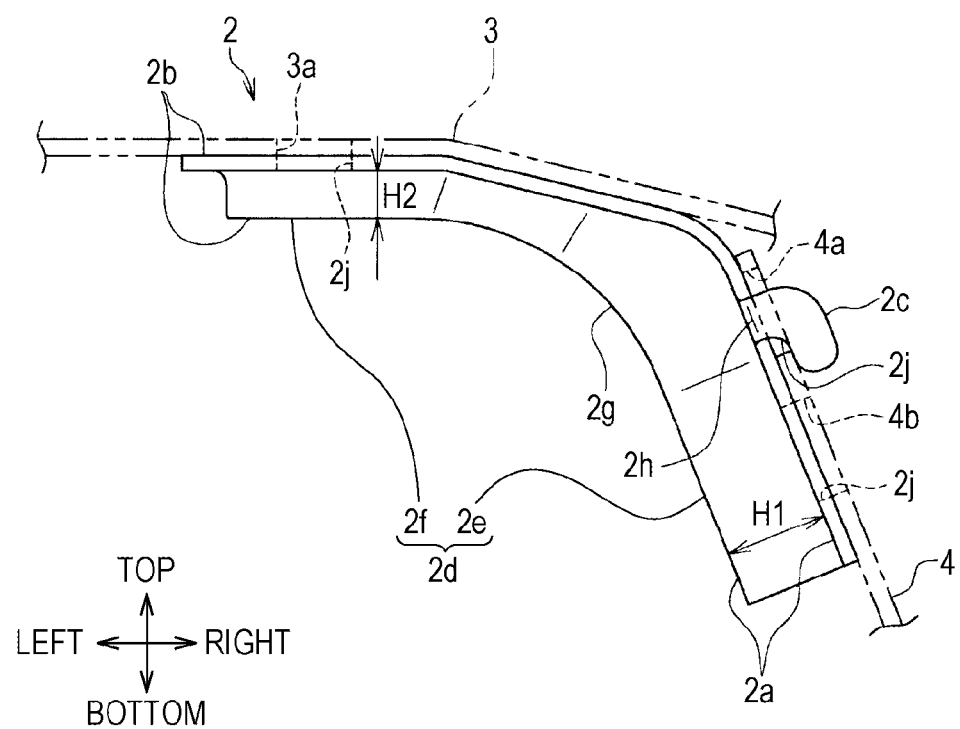
FIG. 4 is a view showing an example of a vehicle body superstructure according to an embodiment of the present invention and an enlarged rear view of a gusset.

As shown in FIG. 4, the locking portions 4a are configured in such a manner that the pair of bolt holes 4b, together with a pair of bolt holes 3a formed in the roof member 3, are aligned with the bolt insertion holes 2j of the gusset 2 when the claws 2c are inserted and locked.

As shown in FIG. 4, the bolt holes 4b are a pair of round holes formed in the side rail members 4 above the pillar 5, through which the bolts B for securing both the longitudinal lower end portions of the gusset 2 are inserted. The bolt holes 4b are formed obliquely downward of the pair of locking portions 4a and are configured in such a manner that, when the claws 2c are inserted into the locking portions 4a and locked, the bolt insertion holes 2j of the gusset 2 are automatically located so as to be aligned with the bolt holes 4b.

[Gusset Configuration]

The gusset 2 is a metallic plate member formed substantially in an L shape, as viewed from the front (of the vehicle), which reinforces the connecting portion between the roof member 3 and the side rail members 4. The gusset 2 has rail side surfaces 2a, roof side surfaces 2b, claws 2c, a bead 2d, a curved portion 2g, and bolt insertion holes 2j, all of which will be described later.

[Rail Side Surface Configuration]

Figure 2:
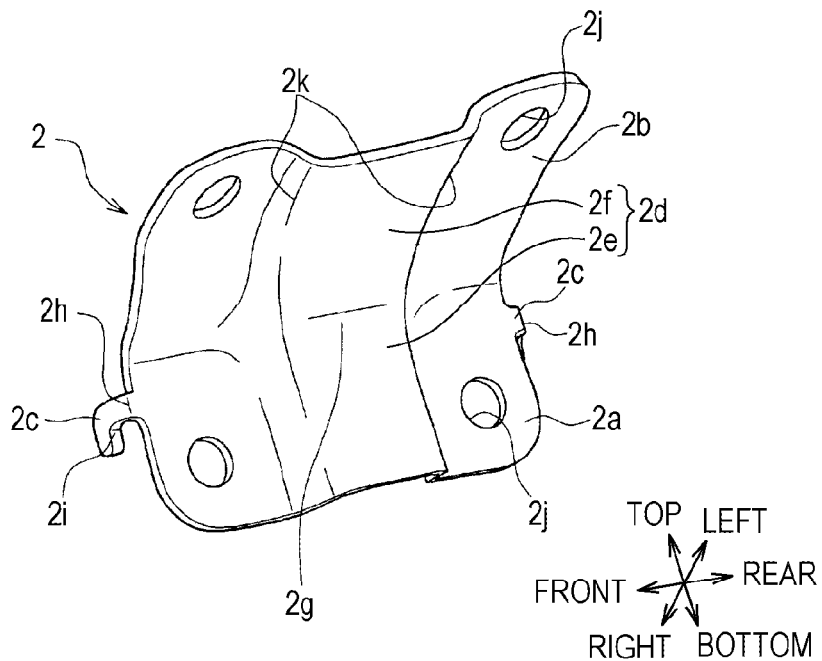
FIG. 2 is a view showing an example of a vehicle body superstructure according to an embodiment of the present invention and an enlarged perspective view of a gusset.

As shown in FIGS. 1 and 2, the rail side surfaces 2a are lower half sections of the gusset 2 to be fixed to the side rail members 4 and extend vertically. In other words, the rail side surfaces 2a are gusset fixing surfaces through which the gusset 2 is fixed to the side rail members 4, and are formed substantially vertically along the interior-side surface of the side rail members 4. The rail side surfaces 2a are provided at the front and rear of the bead 2d.

[Roof Side Surface Configuration]

The roof side surfaces 2b are upper half sections of the gusset 2 to be affixed to the roof member 3 and extend breadthways. In other words, the roof side surfaces 2b are roof fixing surfaces through which the gusset 2 is fixed to the roof member 3, and is formed horizontally along the interior-side surface of the roof member 3.

[Claw Configuration]

As shown in FIG. 4, the claws 2c are a pair of locking lugs that are inserted into the locking portions 4a formed in the side rail members 4, which extend from both longitudinal ends of the gusset 2 and are formed in a bent (hook) shape with their ends bent downward.

As shown in FIG. 2, the claws 2 have first bent portions 2h that are bent at both front and rear ends of the gusset 2 and extend breadthways outward and second bent portions 2i that are bend at the ends of the first bent portions 2h and extend downward. Thus, the claws 2c are formed by causing the gusset 2 to be pressed and bent in such a manner that the claws 2 project in an L or hook shape from both ends of the rail side surface 2a toward the side rail members 4 (see FIG. 5). The second bent portions 2i and the ends of the claws 2c have rounded edges to allow easier insertion into the locking portions 4a (see FIG. 5).

[Bead Configuration]

As shown in FIG. 2, the bead 2d is a reinforcement bulge that is formed between the pair of claws 2c, 2c so as to extend from the lower middle portion of the rail side surface 2a to the breadthways inner end of the roof side surface 2b and bulge toward the vehicle interior. The bead 2d has a vertical bead 2e that is formed in the rail side surface 2a and extends vertically and a horizontal bead 2f that is formed in the roof side surface 2b and extends breadthways. The bead 2d has a substantially recess-shaped section and is continuously formed in such a manner that the ridge lines of the vertical bead 2e and the horizontal bead 2f meet each other.

[Vertical Bead and Horizontal Bead Configuration]

As shown in FIG. 4, the depth (height) H1 of the vertical bead 2e is larger than the depth (height) H2 of the horizontal bead 2f.

Figure 3:
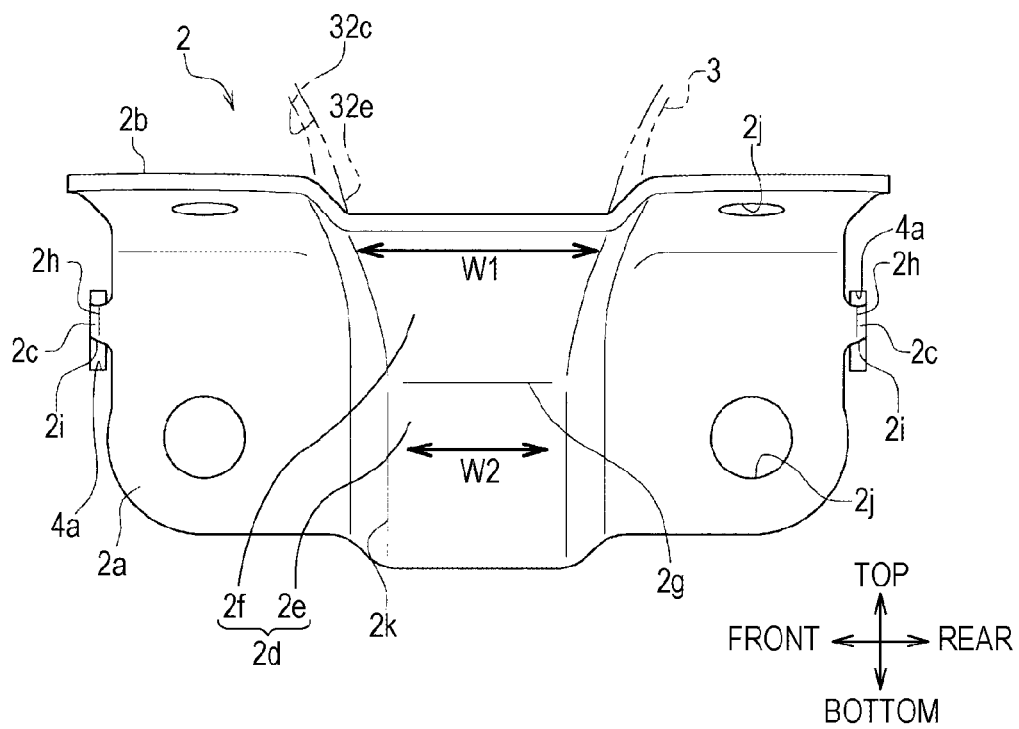
FIG. 3 is a view showing an example of a vehicle body superstructure according to an embodiment of the present invention and an enlarged right side view of a gusset.

As shown in FIG. 3, the longitudinal width W1 of the horizontal bead 2f is larger than the longitudinal width W2 of the vertical bead 2e. The horizontal bead 2f is configured to be mated with the projecting portion 32c of the roof member 3.

The curved portion 2g is provided between the vertical bead 2e and the horizontal bead 2f so as to continuously connect such beads, and is formed by folding the middle portion of the gusset 2 substantially in an L shape along a vehicle interior wall (see FIGS. 2 and 4).

As shown in FIG. 3, the bead 2d is formed in a folding-fan shape in such a manner that the longitudinal width W1 increases toward the upper end from the curved portion 2g. The vertical bead 2e located below the curved portion 2g of the bead 2d has the width W2 maintained constant between the curved portion 2g and the lower end.

The bolt insertion holes 2j are through-holes through which the bolts B (see FIG. 5) for securing the gusset 2 to the vehicle body 2 are inserted, and are formed by performing drilling at right and left ends of or at four locations in the gusset 2. The bolt insertion holes 2j are formed close to the upper and lower ends of the bead 2d extending vertically in the middle portion of the gusset 2. As shown in FIG. 4, the lower two of the four bolt insertion holes 2j correspond to the bolt holes 4b of the side rail members 4, respectively, while the upper two correspond to the bolt insertion holes 3a of the roof member 3, respectively.

As shown in FIG. 2, the ridge lines 2k of the gusset 2 are right and left folded portions created when the bead 2d having a recess-shaped section is formed into the gusset 2, and extend from the lower end of the vertical bead 2e to the interior-side upper end of the horizontal bead 2f. The ridge lines 2k serve to reinforce the whole of the gusset 2 and the bead 2d, and also to bring the gusset 2 into alignment with the ridge lines 32e of the projecting portions 32c of the roof member 3 and thereby support the gusset 2 in place in the roof member 3, and furthermore to bring a locking projected portion 51a (see FIG. 5) into engagement with a space between the inner wall of the vertical bead 2e and the interior-side surface of the side rail members 4 and thereby support the upper end of the pillar garnish 51.

[Pillar Configuration]

Figure 5:
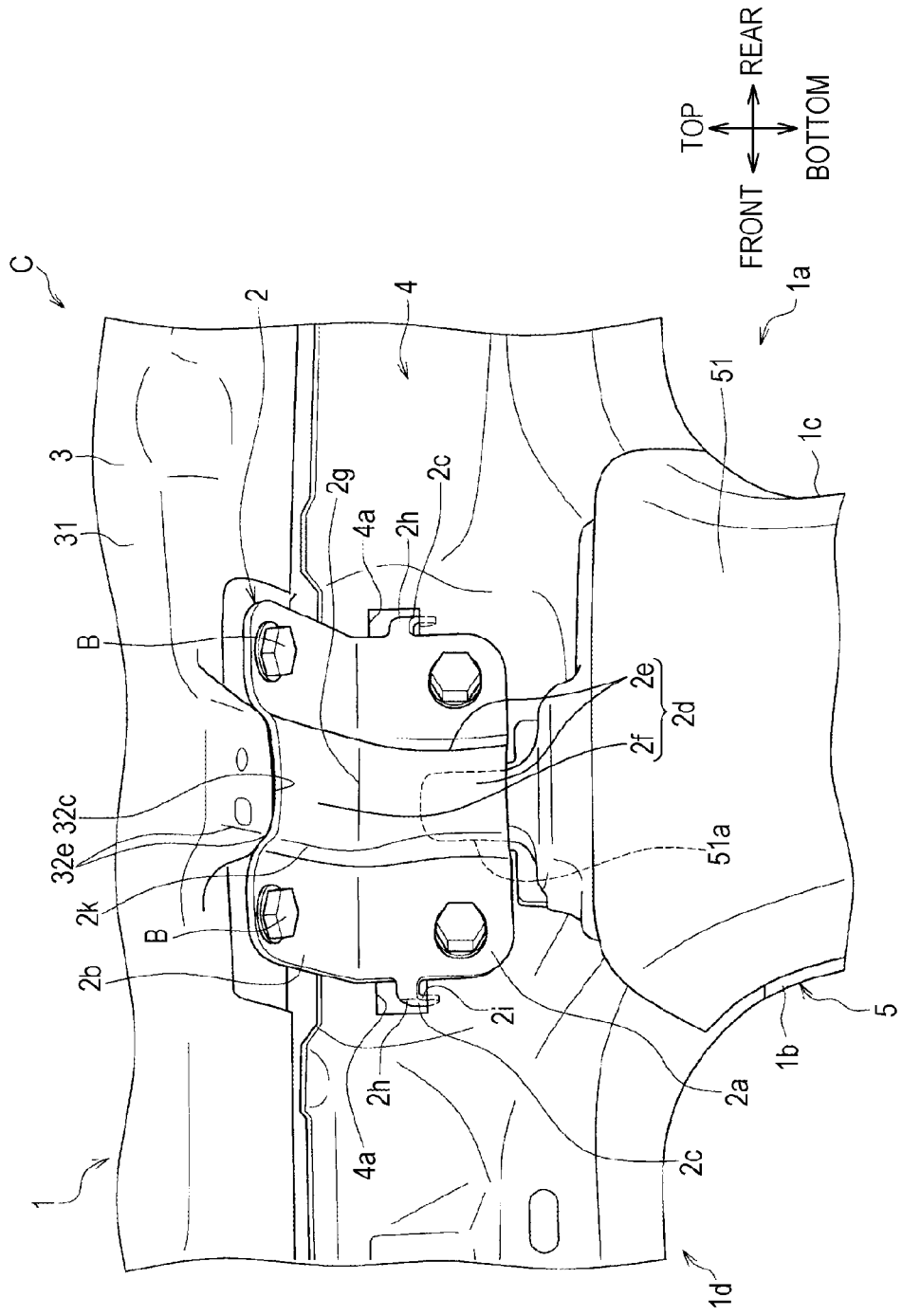
FIG. 5 is an enlarged perspective view showing an example of a vehicle body superstructure according to an embodiment of the present invention.

As shown in FIG. 5, the pillar 5 is a pillar-like frame member that is provided below the side rail members 4 so as to extend vertically downward and is covered at the vehicle interior side thereof with a pillar garnish 51. For fabrication of the pillar 5, a center pillar inner member (not illustrated)

formed by pressing a metallic plate member, such as a steel sheet, a pillar inner main body, and a center pillar outer member are joined to form a center pillar having a tube-like closed section. The pillar 5 is covered at the vehicle interior side thereof with the pillar garnish 51.

The pillar garnish 51 has the locking projected portion 51a formed at the upper end thereof so as to project, the locking projected portion 51a being engaged with the vertical bead 2e of the gusset 2.

[Action of Body Superstructure]

Next, with reference to FIGS. 1 through 5, the action of the body superstructure according to an embodiment of the present invention is described below. The installation of the gussets 2 in the side rail members 4 and the roof member 3 is described.

As shown in FIGS. 3 and 4, when an attempt is made to install the gussets 2 in the side rail members 4 and the roof member 3, first the right and left claws 2c are inserted into the locking portions 4a of the side rail members 4.

As shown in FIG. 5, the claws 2c of the gusset 2 project toward the body side 1a (toward the side rail member 4) from the longitudinal ends of the gusset 2. For this, when the horizontal bead 2f is brought into engagement with the projecting portion 32c of the roof member 3 and be moved toward the side rail members 4, the gusset 2 is moved under guidance of the projecting portion 32c, causing the claws 2c to be automatically inserted into and locked in the locking portions 4a.

As shown in FIGS. 4 and 5, even if an assembly line worker releases his or her hand from the gusset 2, the claws 2c remain locked in the locking portions 4a. This prevents the gusset 2 from dropping from the side rail members 4, thereby allowing the worker to easily fasten the bolt B for securing the gusset 2 to the vehicle body 1.

As shown in FIG. 4, if the worker releases his or her hand from the gusset 2, the gusset 2 moves downward under its own weight, which causes the hook-shaped claws 2c to be easily locked in the locking portions 4a, thereby allowing the gusset 2 to be automatically put into place ready for fixation to the side rail members 4 and the roof member 3. Even if the gusset 2 makes a rocking motion, this arrangement keeps the gusset 2 locked in and makes it difficult for the gusset 2 to drop, thereby enhancing the workability and working efficiency in locating and fixing the gusset 2.

As shown in FIG. 3, the claws 2c have the first bent portions 2h extending from the longitudinal ends of the gusset 2 toward the side rail members 4, which eliminates the need for a space set aside for formation of the claws 2c, thereby simplifying the gusset 2. Also, this arrangement can reduce the longitudinal dimension, thereby enhancing the degree of freedom in layout due to the downsizing.

As shown in FIG. 5, the bead 2d and the ridge line 2k extend vertically along the ridge line 32e of the roof member 3 and the ridge line 2k of the vertical bead 2e and the horizontal bead 2f between the rail side surface 2a and the roof side surface 2b of the gusset 2. As shown in FIG. 3, the longitudinal width W1 of the horizontal bead 2f is larger than the longitudinal width W2 of the vertical bead 2e. In addition, the depth H1 (height) of the vertical bead 2e is larger than the depth H2 (height) of the horizontal bead 2f. This arrangement results in improved strength and stiffness of the gusset 2.

Furthermore, reduced depth H2 of the horizontal bead 2f results in a reduced difference in height between the horizontal bead 2f and the roof member 3, thereby improving the efficiency of transmission of impact load to the roof member 3.

As shown in FIG. 5, the gusset 2 is firmly fixed to the roof member 3 and the side rail members 4 by fastening the four bolts B to the bolt holes 4b through the bolt insertion holes 2j. When the bolts B are fastened, the claws 2c are locked in the locking portions 4a of the side rail members 4, which prevents the gusset 2 from falling, eliminating the need for the worker to hold the gusset 2. This enhances the workability in fastening the bolts for securing the gusset 2 to the vehicle body 1.

As shown in FIG. 1, the right and left ends of the roof member 3 are joined to the side rail members 4. The substantially L-shaped gusset 2 is laid and bolted using the bolts B at the upper portion of the pillar 5 over a joining portion between the roof member 3 and the side rail members 4 so as to straddle the joining portion between the roof member 3 and the side rail members 4. This arrangement allows the gusset 2 to reinforce the joining portion between the roof member 3 and the side rail members 4 and thereby improve its strength and stiffness.

Using the bolts B, the gusset 2 is secured at the rail side surface 2a thereof to the side rail members 4 above the upper middle end of the pillar 5.

As a result, if the vehicle C sustains a side impact, the thus applied side impact load is efficiently transmitted to the roof member 3 from the pillar 5 and the side rail members 4 through the gussets 2, thereby enhancing the breadthways transmission efficiency in the vehicle body 1.

If the vehicle C sustains a side impact, the side impact load exerted on the pillar 5 is input in the direction in which the gusset 2 is rotated toward an upper vehicle interior. For this, if a greater load is input, the horizontal bead 2f can be brought into contact with the projecting portion 32c, thereby preventing such a rotation of the gusset 2. This arrangement allows the horizontal bead 2f having high strength to transmit the load to the roof member 3 and thereby disperse the side impact load.

As shown in FIG. 5, the pillar garnish 51 can be firmly fixed to the side rail members 4 and the pillars 5 since the locking projected portion 51a is mated with the vertical bead 2e of the gusset 2. This arrangement prevents the pillar garnish 51 from coming off from the vehicle body 1 in the event of the deployment of a side curtain airbag (not illustrated), thereby eliminating the possibility that an occupant comes into contact with the pillar garnish 51.

Examples of Modification

The present invention is typically described with reference to, but not limited to, the foregoing embodiments. Various modifications and changes are conceivable within the scope of the present invention. Needless to say, the present invention can be applied to such modifications and changes. The reference numerals and symbols refer to the same components as those with the same reference numerals and symbols in the embodiment described above, and repeated descriptions of the same components are omitted.

Figure 6:
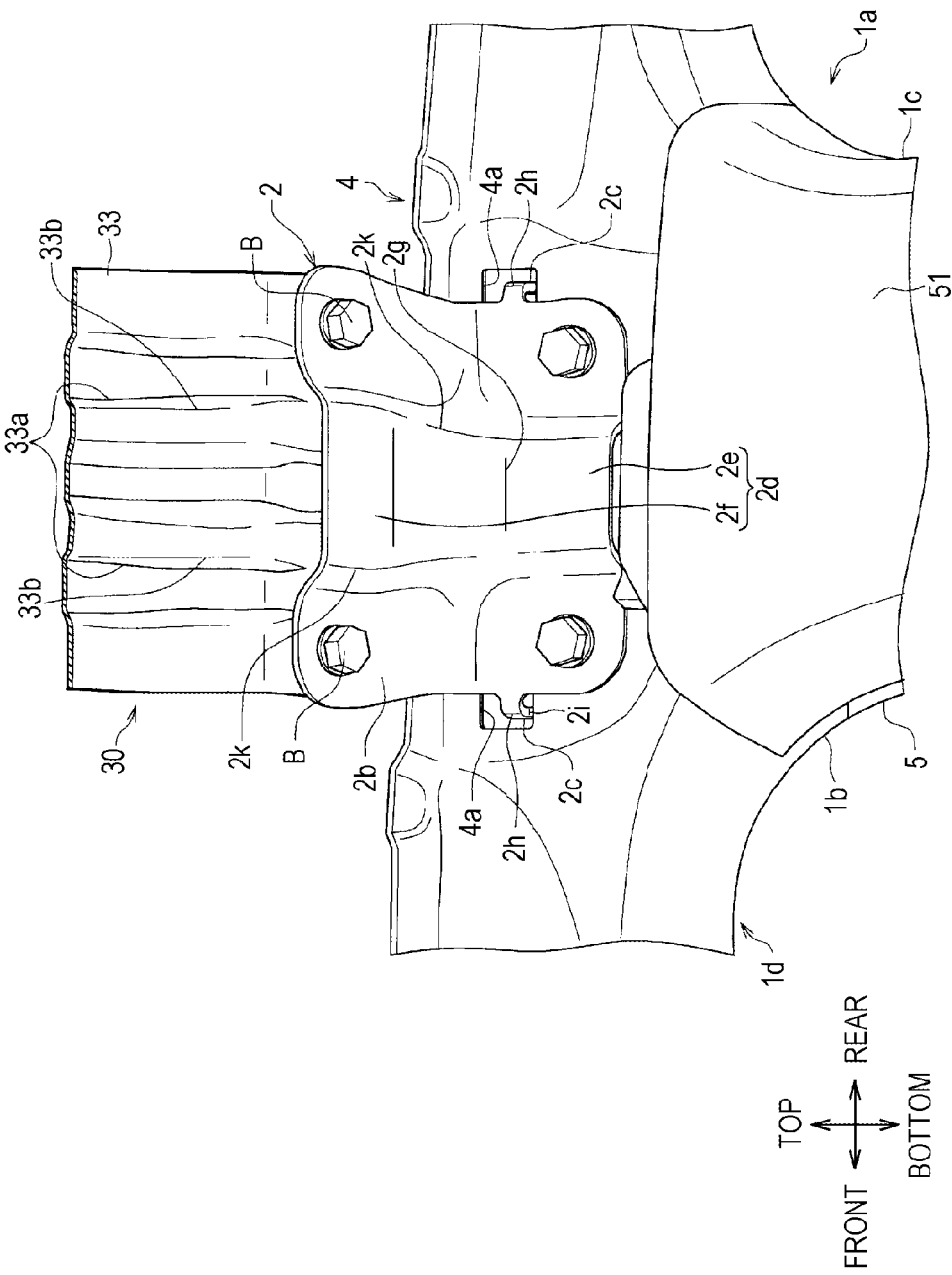
FIG. 6 is a schematic perspective view showing an example of modification of a vehicle body superstructure according to an embodiment of the present invention.
Figure 7:
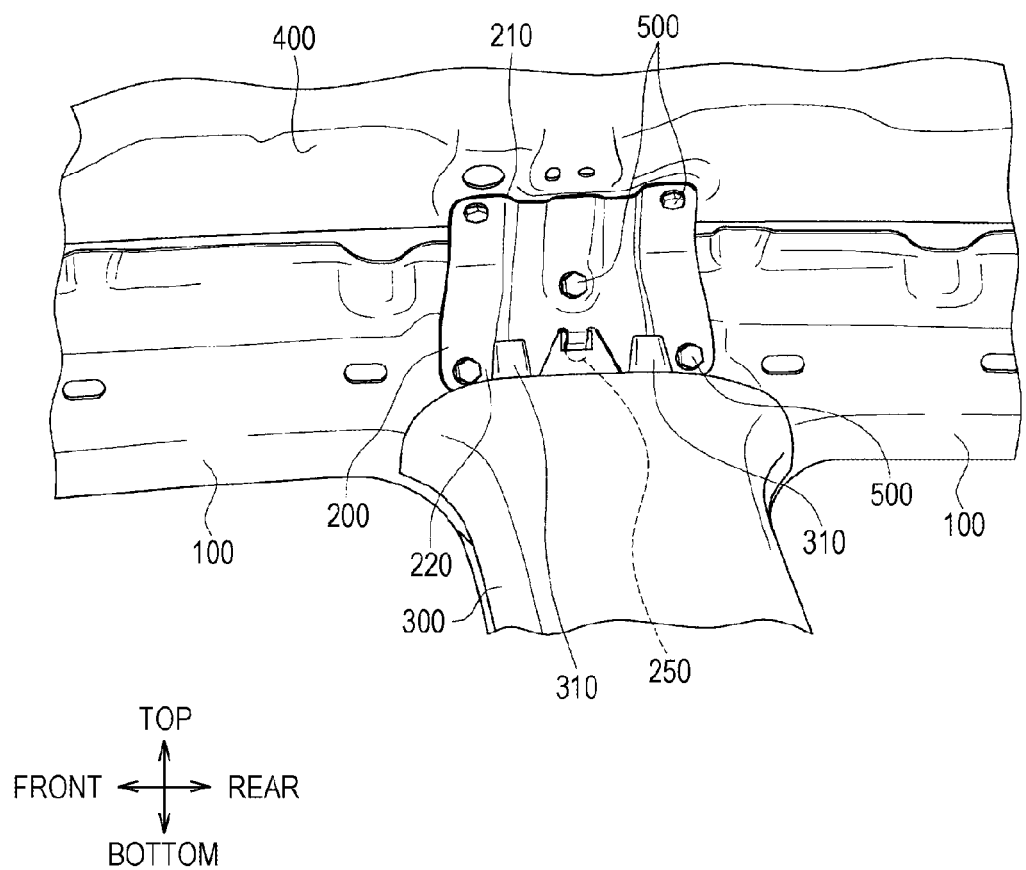
FIG. 7 is a perspective view showing a conventional vehicle body superstructure.
Figure 8:
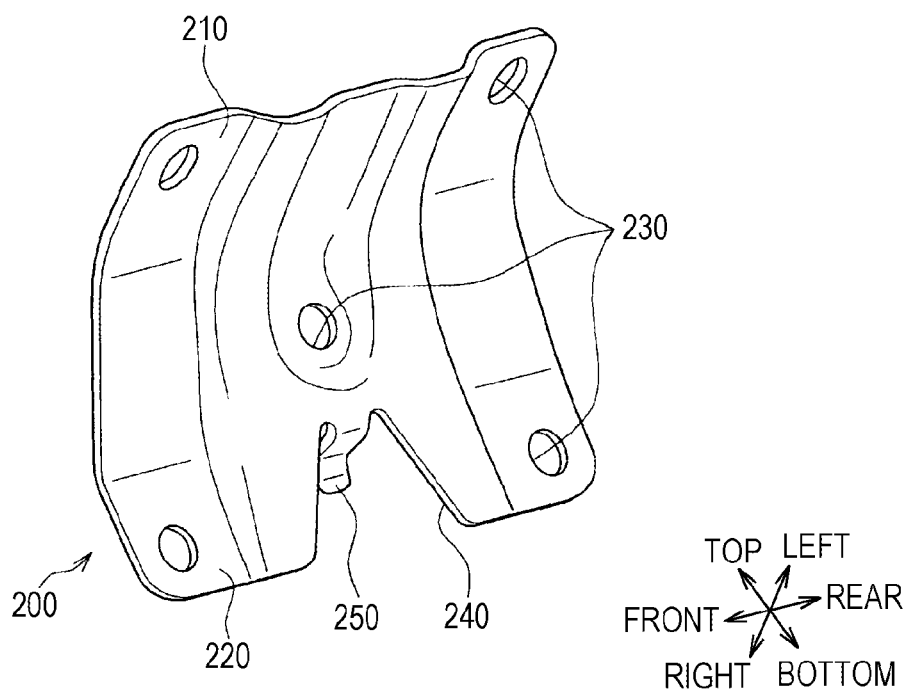
FIG. 8 is a perspective view showing a conventional vehicle body superstructure and an enlarged perspective view of a gusset.

FIG. 6 is a schematic perspective view showing an example of modification of a vehicle body superstructure according to an embodiment of the present invention.

As shown in FIG. 1, in the embodiment described above, the roof member 3 constructed of the roof panel 31 and the roof stiffener 32 is described as an example of the present invention, but is not limited to this. As shown in FIG. 6, the roof member 30 may include, for example, a roof arch 33.

In this case, the roof arch 33 is provided with an arch bead 33a extending breadthways. Ridge lines 33b formed the arch bead 33a are disposed so as to correspond to the ridge lines 2k formed in the bead 2d.

For this reason, if the vehicle C sustains a side impact, the side impact load can be efficiently transmitted from the gusset 2 to the roof arch 33 of the roof member 30 via the ridge lines 2k of the bead 2d and the ridge lines 32e of the arch bead 33a, thereby enhancing the breadthways transmission efficiency of a side impact load in the vehicle body 1.

Other Example of Modification

Although the gusset 2 disposed close to the center pillar at the joining portions between the side rail members 4 and the roof member 3 is described as an example in the embodiment described above as shown in FIG. 1, the present invention can also be applied to portions in which other pillar (for example, a front pillar or a rear pillar) is disposed in the side rail members 4 extending longitudinally.

As shown in FIG. 1, in the embodiment described above, the joining portions between the roof member 3 and the side rail members 4 are described as an example of the portion in which the gusset 2 is mounted, but is not limited to this. The present invention can be applied to, for example, a joining portion where the body frame member and other body frame member are joined to each other at an angle. In this case, the gusset 2 may be mounted in such a joining portion so as to straddle the body frame member and other body frame member.

A vehicle body superstructure according to an embodiment of the present invention includes a pair of right and left side rail members extending longitudinally, a roof member that is supported at right and left ends thereof by the side rail members, and a gusset having a rail side surface that extends vertically and is fixed to the side rail members and a roof side surface that extends breadthways and is fixed to the roof member, wherein the gusset has a pair of claws formed at longitudinal ends thereof, the claws being locked in locking portions formed in the side rail members, and a bead that is provided between the pair of claws so as to extend from a bottom end of the rail side surface to a breadthways inner end of the roof side surface.

With this arrangement, the gusset has a bead provided between the pair of claws so as to extend vertically from the bottom end of the rail side surface to a breadthways inner end of the roof side surface, which causes the bead to support the rail side surface and the roof side surface, thereby enhancing the strength and stiffness of the gusset. For this reason, the gusset allows the bead to receive a load exerted when a vehicle sustains a side impact and prevent the deformation of the entire gusset, thereby enhancing side impact load transmission efficiency.

Also, the gusset has a pair of claws formed at longitudinal ends thereof, the claws being locked in locking portions formed in the side rail members, which prevent the gusset from dropping when an attempt is made to fix the gusset with bolts. This can eliminate the need for an assembly line worker to hold the gusset in fixing the gusset and enhance the workability and working efficiency in fixing the gusset with bolts.

In a vehicle body superstructure according to an embodiment the present invention, it is preferable that the roof member includes a roof arch extending breadthways and such a roof arch is provided with an arch bead extending breadthways in such a manner that a ridge line formed in the arch bead corresponds to the ridge line formed in the bead.

With this arrangement, the roof arch has the ridge line formed in the arch bead, which is disposed so as to correspond to the ridge line formed in the bead, which allows both of the ridge lines having a relatively high strength to transmit an impact load, hereby enhancing the efficiency of transmission of a side impact load from the gusset to the roof arch.

In a vehicle body superstructure according to an embodiment of the present invention, it is preferable that the roof member includes a roof stiffener and the roof stiffener has a projecting portion formed at a position corresponding to the breadthways inner side of the bead.

With this arrangement, the roof stiffener of the roof member has a projecting portion formed at a position corresponding to the breadthways inner side of the bead, which, when a vehicle sustains a side impact, causes the side impact load exerted on the pillar to be input in the direction in which the gusset is rotated toward an upper vehicle interior, thereby allowing the side impact load to be borne by the projecting portion and be transmitted to the roof stiffener.

In a vehicle body superstructure according to an embodiment of the present invention, it is preferable that the bead has a vertical bead that is formed in the rail side surface and extends vertically and a horizontal bead that is formed in the roof side surface and extends breadthways, and that the vertical bead is formed larger in depth than the horizontal bead.

With this arrangement, the vertical bead formed larger in depth than the horizontal bead can enhance the resistance of the vertical bead to a side impact load. The horizontal bead formed smaller in depth than the vertical bead results in a smaller difference in height between the horizontal bead and the roof arch, thereby improving the efficiency of transmission of a side impact load to the roof arch when the vehicle sustains a side impact.

In a vehicle body superstructure according to an embodiment of the present invention, it is preferable that the bead has a vertical bead that is formed in the rail side surface and extends vertically and a horizontal bead that is formed in the roof side surface and extends breadthways, and that the horizontal bead is formed larger in longitudinal width than the vertical bead.

With this arrangement, the horizontal bead formed larger in longitudinal width than the vertical bead can improve the resistance of the horizontal bead to a side impact load when the vehicle sustains a side impact.

In a vehicle body superstructure according to an embodiment of the present invention, it is preferable that the bead has a vertical bead that is formed in the rail side surface and extends vertically and a horizontal bead that is formed in the roof side surface and extends breadthways, and that a curved portion is formed between the vertical bead and the horizontal bead so as to continuously connect the vertical and horizontal beads, and that the curved portion is formed in a folding-fan shape in such a manner that the longitudinal width increases toward the upper end.

With this arrangement, the curved portion is continuously formed between the vertical bead and the horizontal bead portion in a folding-fan shape in such a manner that the longitudinal width increases toward the upper end, thereby improving the efficiency of transmission of a side impact load from the roof side surface to the roof member when the vehicle sustains a side impact.

In a vehicle body superstructure according to an embodiment of the present invention, it is preferable that the claws have first bent portions that are bent at front and rear ends of the gusset and extend breadthways outward and second bent portions that are bent at the ends of the first bent portions and extend downward.

With this arrangement, the claws have first bent portions that are bent at front and rear ends of the gusset and extend breadthways outward and second bent portions that are bend at the ends of the first bent portions and extend downward, thereby allowing simplification of the shape of the claws as locking mechanisms and the structure of locking portions in the side rail members.

Also, the claws have the first bent portions that are bent at front and rear ends of the gusset and extend breadthways outward, which reduce the longitudinal dimension of the gusset, thereby enhancing the degree of freedom in layout.

Furthermore, when an attempt is made to lock the gusset in the locking portions of the side rail members before its installation in the vehicle body, the claws cause the second bent portions to be locked in the locking portions, thereby allowing the gusset to be held in place without the need to hold the gusset with hands. This arrangement enhances the workability and working efficiency in fixing the gusset to the vehicle body.

In a vehicle body superstructure according to an embodiment of the present invention, it is preferable that a longitudinally extending pillar and a pillar garnish that covers the interior side of the pillar are provided below the side rail members, and that the pillar garnish is provided at an upper end thereof with a locking projected portion that is locked in the bead of the gusset.

With this arrangement, the locking projected portion formed in the pillar garnish allows the upper end of the pillar garnish to be locked firmly. For example, in a vehicle provided with a side curtain airbag, this arrangement prevents the pillar garnish from deforming and coming off in the event of the deployment of the side curtain airbag, thereby eliminating injury to an occupant even if the occupant comes into contact with the garnish when the vehicle sustains a side impact.

The embodiment of the present invention can provide a vehicle body superstructure that has a gusset having improved stiffness and strength.

Obviously, numerous modifications and variations of the present invention are possible in light of the above teachings. It is therefore to be understood that within the scope of the appended claims, the invention may be practiced otherwise than as specifically described herein.

What is claimed is:

1. A vehicle body superstructure comprising:
   a first side rail member extending along a longitudinal direction of a vehicle body;
   a second side rail member extending along the longitudinal direction;
   a roof member including a first end and a second end, the first end being supported by the first side rail member, the second end being supported by the second side rail member; and
   a gusset comprising:
      a rail side surface extending along a vertical direction of the vehicle body and connected to the first and second side rail members;
      a roof side surface extending along a breadthways direction of the vehicle body and connected to the roof member;
      a first claw provided at a first longitudinal end of the gusset and locked in a first locking portion provided in the first side rail member;
      a second claw provided at a second longitudinal end of the gusset and locked in a second locking portion provided in the second side rail member; and
      a bead provided between the first and second claws to extend from a bottom end of the rail side surface to a breadthways inner end of the roof side surface, wherein
   the first claw has a first front bent portion bent at front end of the gusset and extending outward along the breadthways direction and a second front bent portion bent at an end of the first front bent portion and extending downward, and
   the second claw has a first rear bent portion bent at rear end of the gusset and extending outward along the breadthways direction and a second rear bent portion bent at an end of the first rear bent portion and extending downward.

2. The vehicle body superstructure according to claim 1, wherein
   the roof member includes a roof arch extending along the breadthways direction, and
   the roof arch is provided with an arch bead extending along the breadthways direction in such a manner that a ridge line provided in the arch bead corresponds to the ridge line provided in the bead.

3. The vehicle body superstructure according to claim 1, wherein the roof member includes a roof stiffener having a projecting portion provided at a position corresponding to a breadthways inner side of the bead.

4. The vehicle body superstructure according to claim 1, wherein
   the bead has a vertical bead provided in the rail side surface and extending along the vertical direction and a horizontal bead provided in the roof side surface and extending along the breadthways direction, and
   a depth of the vertical bead is larger than a depth of the horizontal bead.

5. The vehicle body superstructure according to claim 1, wherein
   the bead has a vertical bead provided in the rail side surface and extending along the vertical direction and a horizontal bead provided in the roof side surface and extending along the breadthways direction, and
   a width of the horizontal bead is larger than a width of the vertical bead in the longitudinal direction.

6. The vehicle body superstructure according to claim 5, wherein
   a curved portion is provided between the vertical bead and the horizontal bead to continuously connect the vertical and horizontal beads to each other, and
   the curved portion has a folding-fan shape in such a manner that a longitudinal width of the curved portion in the longitudinal direction increases toward an upper end of the curved portion.

7. A vehicle body superstructure comprising:
   a first side rail member extending along a longitudinal direction of a vehicle body;
   a second side rail member extending along the longitudinal direction;
   a roof member including a first end and a second end, the first end being supported by the first side rail member, the second end being supported by the second side rail member;
   a gusset comprising:
      a rail side surface extending along a vertical direction of the vehicle body and connected to the first and second side rail members;
      a roof side surface extending along a breadthways direction of the vehicle body and connected to the roof member;
      a first claw provided at a first longitudinal end of the gusset and locked in a first locking portion provided in the first side rail member;
      a second claw provided at a second longitudinal end of the gusset and locked in a second locking portion provided in the second side rail member; and a bead provided between the first and second claws to extend from a bottom end of the rail side surface to a breadthways inner end of the roof side surface;

a pillar extending along the vertical direction and provided below the first and second side rail members; and a pillar garnish covering an interior side of the pillar and provided below the first and second side rail members, an upper end of the pillar garnish being provided with a locking projected portion locked in the bead of the gusset.

8. The vehicle body superstructure according to claim 1, wherein the first locking portion includes a first opening, the second locking portion includes a second opening, the first claw is inserted into the first opening to engage with the first side rail member, and the second claw is inserted into the second opening to engage with the second side rail member.

* * * * *